(12) United States Patent
Häggander (10) Patent No.: US 7,299,622 B2
(45) Date of Patent: Nov. 27, 2007

(54) COMPONENT FOR BEING SUBJECTED TO HIGH THERMAL LOAD DURING OPERATION AND A METHOD FOR MANUFACTURING SUCH A COMPONENT

(75) Inventor: Jan Häggander, Trollhättan (SE)

(73) Assignee: Volvo Aero Corporation, Trollhattan (SE)

( * ) Notice: Subject to any disclaimer, the term of this patent is extended or adjusted under 35 U.S.C. 154(b) by 0 days.

(21) Appl. No.: 10/710,108

(22) Filed: Jun. 18, 2004

(65) Prior Publication Data

US 2005/0188678 A1 Sep. 1, 2005

Related U.S. Application Data

(63) Continuation of application No. PCT/SE02/02085, filed on Nov. 15, 2002.

(60) Provisional application No. 60/340,490, filed on Dec. 18, 2001.

(30) Foreign Application Priority Data

Dec. 18, 2001 (SE) .................................. 0104273

(51) Int. Cl.
 *F02K 9/00* (2006.01)
(52) U.S. Cl. .......................................... 60/257; 60/266
(58) Field of Classification Search ................ 60/257, 60/260, 752–760, 770, 266; 752/752; 755/755; 756/756; 757/757; 758/758; 760/760; 290/890.01; 239/127.1, 265.11; 29/890.01
See application file for complete search history.

(56) References Cited

U.S. PATENT DOCUMENTS

| | | | |
|---|---|---|---|
| 3,066,702 A | * | 12/1962 | Tumavicus ................. 138/111 |
| 3,126,702 A | * | 3/1964 | Newcomb ..................... 60/260 |
| 3,224,678 A | | 12/1965 | Rosman |
| 3,605,412 A | * | 9/1971 | Stockel et al. ................ 60/260 |
| 3,630,449 A | * | 12/1971 | Butler ..................... 239/127.1 |
| 3,695,515 A | | 10/1972 | Stockel |
| 4,055,044 A | | 10/1977 | Dederra et al. |
| 4,369,920 A | | 1/1983 | Schmidt |
| 4,555,901 A | * | 12/1985 | Wakeman et al. ............ 60/796 |
| 4,622,821 A | * | 11/1986 | Madden ....................... 60/757 |
| 4,655,044 A | * | 4/1987 | Dierberger et al. ........... 60/753 |
| 5,333,443 A | * | 8/1994 | Halila .......................... 60/796 |
| 5,363,643 A | * | 11/1994 | Halila .......................... 60/796 |
| 5,435,139 A | * | 7/1995 | Pidcock et al. ............... 60/757 |
| 5,467,528 A | * | 11/1995 | Bales et al. ............... 29/890.01 |
| 5,479,774 A | * | 1/1996 | Burnell et al. ................ 60/804 |
| 5,704,208 A | * | 1/1998 | Brewer et al. ................ 60/766 |
| 5,765,360 A | | 6/1998 | Schmidt et al. |
| 5,799,491 A | * | 9/1998 | Bell et al. ..................... 60/752 |
| 5,832,719 A | * | 11/1998 | Riccardi ....................... 60/267 |
| 6,107,596 A | | 8/2000 | Semenov et al. |
| 6,701,714 B2 | * | 3/2004 | Burd et al. .................... 60/752 |
| 6,920,750 B2 | * | 7/2005 | Haggander et al. ........... 60/267 |
| 6,945,032 B2 | * | 9/2005 | Lundgren .................... 60/260 |

* cited by examiner

*Primary Examiner*—William H. Rodriguez
(74) *Attorney, Agent, or Firm*—Novak Druce & Quigg, LLP (57) ABSTRACT

Method and arrangement for providing a component (1) for being subjected to high thermal load during operation. The component includes a wall structure, which defines an inner space for gas flow. The component is formed by at least a first part (5) that includes an inner wall (8), an outer wall (9) and at least one cooling channel (11) between the walls. An end portion of said inner wall of the first part of the component is joined to a second part (6). The joint (18) is located at a distance from the interior of the component.

28 Claims, 7 Drawing Sheets

COMPONENT FOR BEING SUBJECTED TO HIGH THERMAL LOAD DURING OPERATION AND A METHOD FOR MANUFACTURING SUCH A COMPONENT

CROSS-REFERENCE TO RELATED APPLICATIONS

The present application is a continuation patent application of International Application No. PCT/SE02/02085 filed 15 Nov. 2002 which was published in English pursuant to Article 21(2) of the Patent Cooperation Treaty, and which claims priority to both Swedish Application No. 0104273-8 filed 18 Dec. 2001 AND U.S. Provisional Application No. 60/340,490 also filed 18 Dec. 2001. Said applications are expressly incorporated herein by reference in their entireties.

TECHNICAL FIELD

The present invention relates to a component adapted for being subjected to high thermal load during operation. Exemplarily, the component includes a wall structure that defines an inner space for gas flow. The component further includes a first part having an inner wall, an outer wall and at least one cooling channel located between the walls. An end portion of the inner wall is joined to a second part. In another embodiment, the present invention takes the form of a method for manufacturing such a component.

During use or operation, the component is actively cooled by a coolant flowing in the cooling channels. The coolant may optionally then be used for combustion processes, such as a fuel or fuel component after having served as a coolant.

Exemplarily, the component is utilized as a rocket engine component. This application should be regarded as preferred, however other applications are also possible such as implementation as a component of a jet motor or gas turbine.

In the instance of utilization as a rocket engine component, it serves as a part of a combustion chamber and/or a nozzle for expansion of the combustion gases. The combustion chamber and the nozzle are together commonly referred to as a thrust chamber.

The thrust chamber is, due to manufacturing limitations, normally formed by several sections joined in the axial direction of the chamber. The present invention may be utilized for accomplishing such joinder. The invention may also be applied for joining the thrust chamber to some other rocket engine member, such as a manifold.

BACKGROUND ART

It is known for a rocket engine to include as a component thereof a thrust chamber having several sections joined to each other in an axial direction. Each of the sections is formed by a wall structure having an inner wall, an outer wall parallel thereto, and cooling channels formed between the inner and outer walls. The wall structure is continuous in the circumferential direction of the section.

The inner wall of each of two joined (to be joined) sections projects further (longer) in the extension direction of the wall structure than does the outer wall. The projecting end portion of the inner wall of one section is joined to the adjacent projecting end portion of the inner wall of the other section by a weld joint. In this way, a substantially continuous inner wall is achieved.

Thereafter, a ring-shaped element is radially arranged outside the weld joint, and said element is joined to the end portions of the adjacent outer walls. In this way, the cooling channels of one of the sections can communicate with the cooling channels of the adjacent section.

Even though the above described rocket engine component performs satisfactorily, there is still a desire to increase the life of the component so that it can be used for an increased number of engine cycles.

DISCLOSURE OF INVENTION

One objective or purpose of the present invention is to provide a component capable of being subjected to high thermal load during operation and therefore having an increased service life compared to known components of similar type. This purpose is achieved at least in part by the joint being located at a distance from the interior of the component. In this way, the joint is located remotely from the hot gases that flow on the inside of the component during operation. In this way, the joint is subjected to less thermal stress than the joints of conventionally configured rocket engines or engine components.

According to a preferred embodiment of the invention, an end portion of the inner wall projects outwards from the interior of the component, and a joint to the second part is located at a distance from the edge of the inner wall thereby defining an end portion. By arranging the end portion so that it projects a suitable distance from the edge, the joint may be located at such a distance from the interior of the component that the thermal stresses experienced during operation will be considerably reduced. Further, by utilizing a suitable construction, the joint will have a temperature close to the temperature of the coolant during operation.

Further, due to the joint being remote from the inner wall, the inner wall will not be continuous across the joint. Instead, there will be a slight gap or slit between the two adjacent sections. Axial thermal stresses will therefore be reduced in the area of the joint. More specifically, the inner wall is isolated from axial mechanical stresses imposed on the wall structure.

According to a further development (version) of the previously described embodiment, the end portion of the inner wall projects substantially perpendicularly from the adjacent portion of the inner wall of the first section. This configuration makes the first section especially suitable for being connected to a further section in the axial direction of the component.

According to another preferred embodiment of the invention, the outer wall ends at a distance from the end portion of the inner wall in the extension direction of the wall structure. In this manner a gap between the outer wall and the end portion of the inner wall forms a passage for a coolant flow from the cooling channel. This is an easy and suitable configuration for conducting the coolant from the first section to the component member.

According to an alternative of the previously mentioned embodiment, the outer wall is connected to the end portion of the inner wall and at least one opening is arranged through the outer wall in the vicinity of the end portion of the inner wall forming a passage for a coolant flow from the cooling channel. There will be an increased support in the radial direction of the section due to the outer wall being connected to the inner wall and the pressure capacity of the component is thereby increased.

Preferably, the first and second parts form two adjacent sections in the axial direction of the component in the form of a rocket engine component. Further, the sections are continuous in the circumferential direction of the component.

A further purpose of the invention is to provide a cost efficient method for manufacturing a rocket engine component with an increased life compared to known configurations.

BRIEF DESCRIPTION OF THE DRAWINGS

The invention is described hereinbelow, with reference to the embodiments shown in the appended drawings, of which.

MODE FOR THE INVENTION

Figure 1:
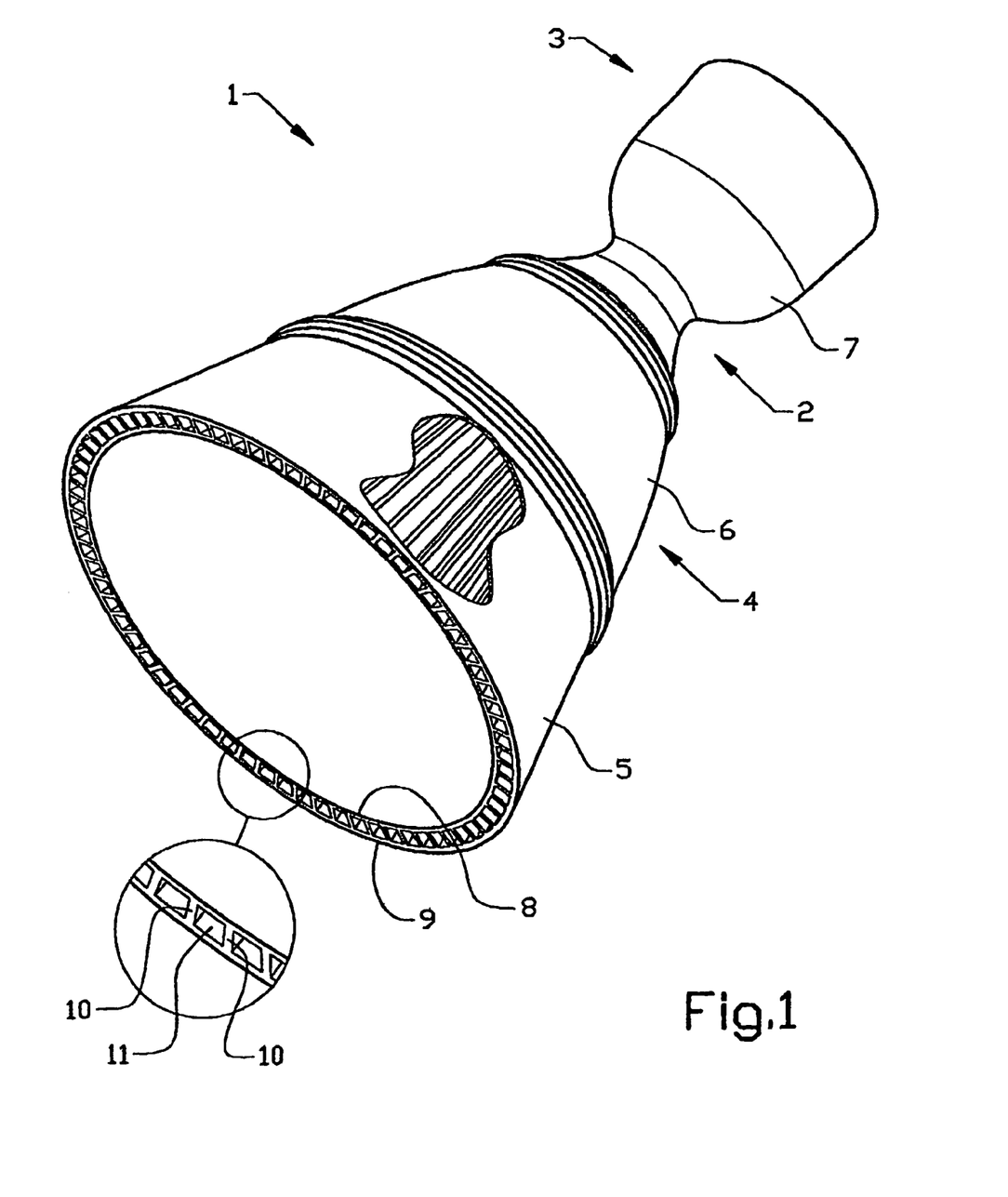
FIG. 1 is a partly cutaway perspective view of a rocket engine thrust chamber configured according to the inventive teachings of the present invention.

In FIG. 1, a rocket engine component 1 in the form of a thrust chamber for a rocket engine is shown. The thrust chamber wall structure is rotationally symmetrical and has a waist 2. The wall structure defines a combustion chamber 3 on one side of the waist, and on the other side of the waist 2, the wall structure extends into a portion with an increasing diameter, and which forms a continuation of the combustion chamber which merges into an exhaust nozzle 4. The thrust chamber 1 comprises (includes, but is not limited to) a first, second and third part, in the form of sections 5-7 that are joined to each other in the axial direction of the chamber. Each of the sections 5-7 are continuous in the circumferential direction.

Figure 2:
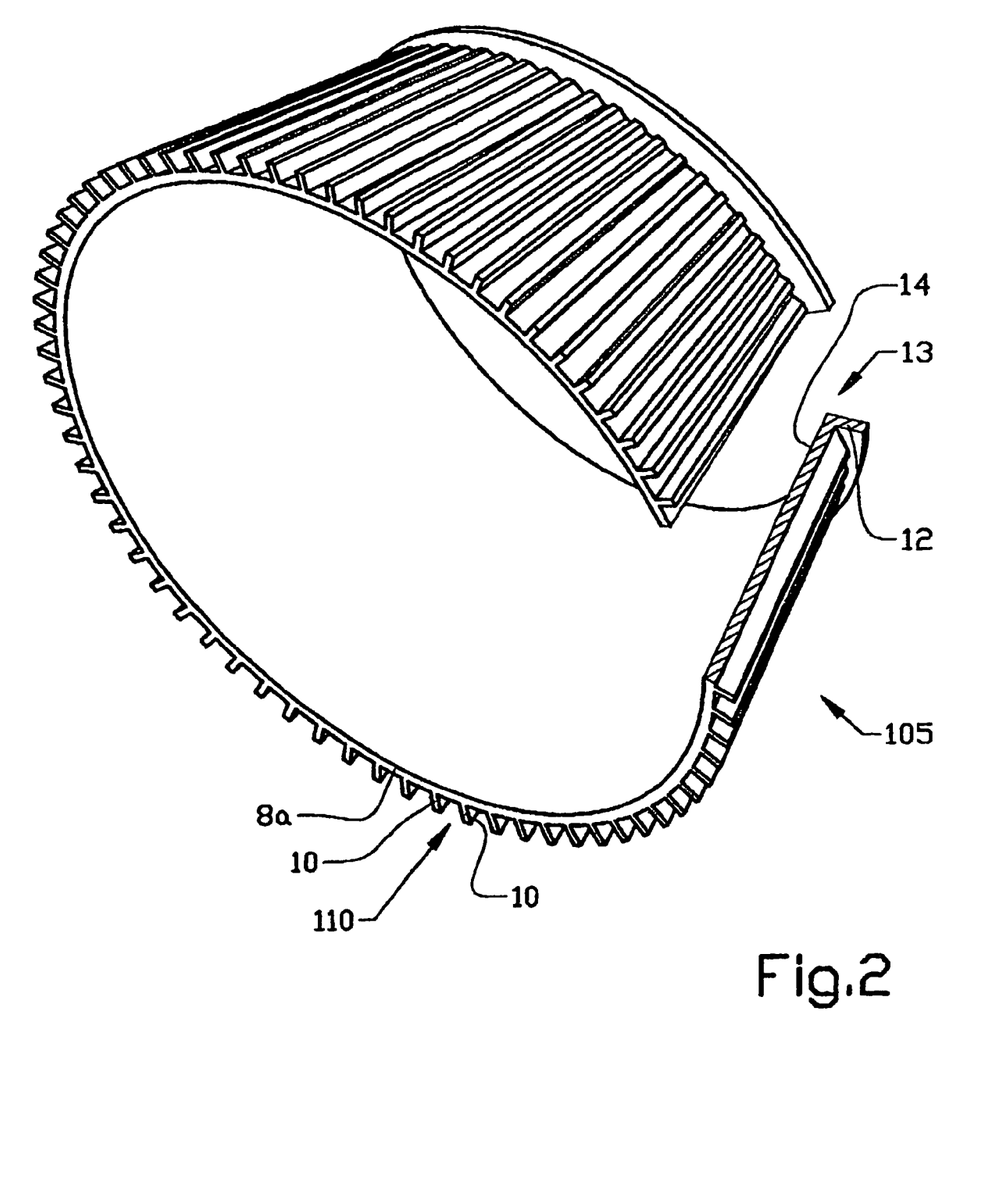
FIG. 2 is a partly cutaway perspective view of a part of a rocket engine section configured according to a first embodiment of the inventive component of the present invention.

The wall structure comprises an inner wall 8 and an outer wall 9 at a radial distance from the inner wall. A plurality of partition walls 10 are arranged between the inner and outer wall 8, 9 thereby defining cooling channels 11 that run in the axial direction of the thrust chamber. A first embodiment of the invention is illustrated in FIGS. 2-5. In FIG. 2, a member 105 of the first section 5 is shown. This member 105 has a circular cross section and is continuous in its circumferential direction. Further, the member 105 comprises an inner wall portion 8a, and the partition walls 10 extend in the axial direction of the section at mutual distances from each other in the circumferential direction of the section. An end portion 12 of the inner wall, in the axial direction, extends radially outwards from the interior of the member 105. The inner wall 8a forms an edge 13 that defines the end portion 12. The end portion 12 projects substantially perpendicular from the adjacent portion 14 of the inner wall 8.

Valleys 110 are formed between the partition walls 10, and are intended to form the cooling channels. This configuration may be manufactured by machining, for example by milling. The outer wall 9 is thereafter positioned radially outside the part 105 thereby forming a casing or hood, and is then connected to the partition walls, for example by welding.

Figure 3:
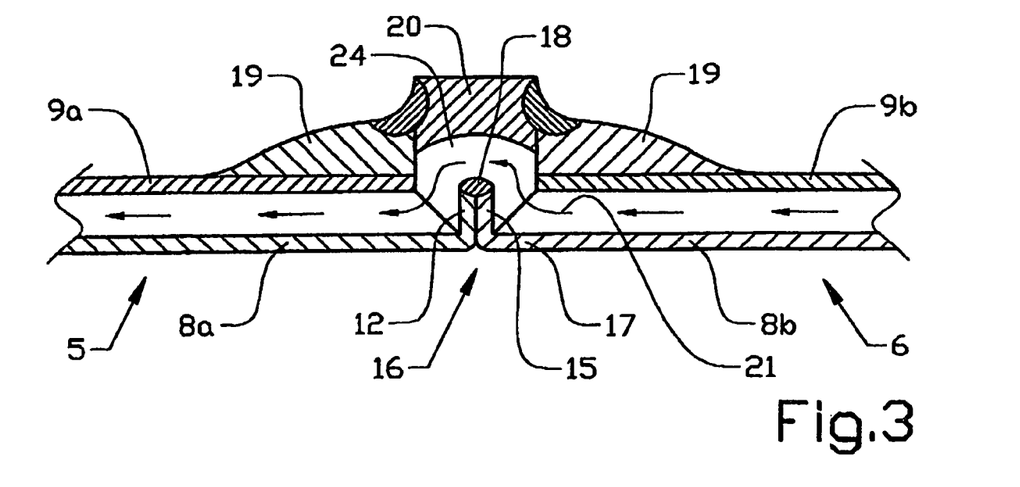
FIG. 3 is a cross-sectional view of the connection region between two adjacent sections configured according to the first embodiment of the invention.

In FIG. 3, the connection region between the first section 5 and the second section 6 is shown. The second section 6 also has an inner wall 8b with an end portion 15 extending radially outwards from the interior of the section 6. The inner wall 8b forms an edge 16 defining the end portion 15. The end portion 15 projects substantially perpendicular from an adjacent portion 17 of the inner wall 8B. The end portions 12, 15 of the two sections 5, 6 are joined by a weld 18 at a distance from the interior of the sections. In FIG. 3, the outer walls of the sections are illustrated by the reference numerals 9a, 9b. Each of the outer walls 9a, 9b ends at a distance from the end portion 12, 15 of the inner wall in the extension direction of the wall structure. The gap between the outer wall 9a, 9b and the end portion 12, 15 of the inner wall forms a passage for a coolant flow from/to the cooling channels in the radial direction of the respective section.

The end portions 19 of the outer walls 9a, 9b are reinforced by an enlarged thickness. Further, a ring-shaped element 20 is arranged outside the joint 18 around the thrust chamber and bridging the distance between the outer walls 9a, 9b. A chamber 24 is formed inside the ring-shaped element 20 communicating with the cooling channels of the first and second sections 5, 6. A passage for a coolant flow 21 is thereby formed from cooling channels of the second section 6 to cooling channels of the first section 5. The ring-shaped element 20 is preferably joined to the outer walls 9a, 9b by welding.

Figure 4:
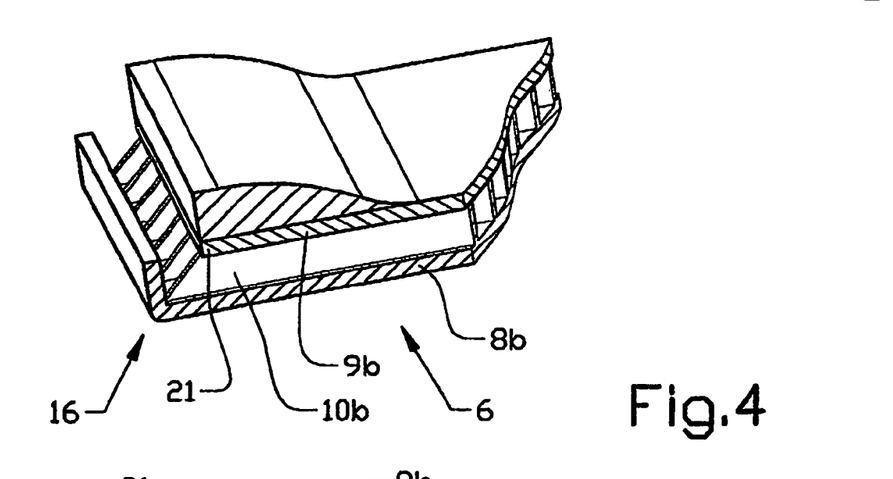
FIG. 4 is a cutaway schematic perspective view of the rocket engine section according to FIGS. 2 and 3.

FIG. 4 shows a schematic, cut view of the second section 6 according to FIG. 3. The drawing is simplified in that the shown part is not curved. The end of each of the partition walls 10 is inclined from the end 21 of the outer wall 9b to the edge 16 of the inner wall 8b. Further, the first section 5 has the corresponding features as is shown and described with respect to the second part 6.

Figure 5:
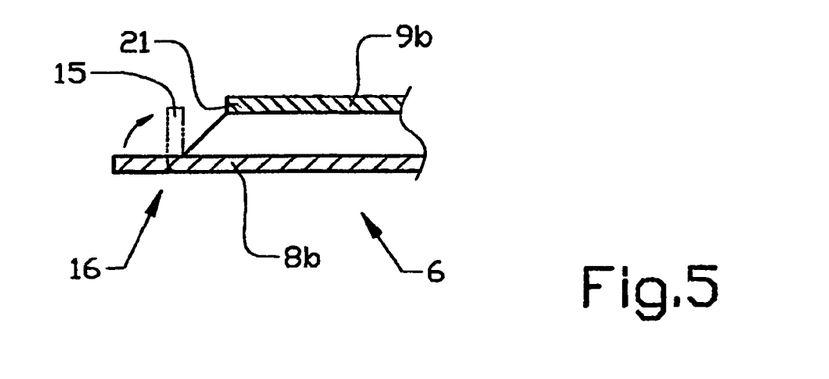
FIG. 5 is a cross sectional side view of the rocket engine section configured according to FIG. 4 and which illustrates a step in the manufacture thereof.

FIG. 5 shows one step for manufacturing the section 6.

The wall structure of the section is produced in such a way that the inner wall 8b is arranged in parallel with the outer wall 9b and projects a distance from the end 21 of the outer wall. Thereafter, the projecting end portion of the inner wall 8b is folded towards the end 21 of the outer wall, thereby forming the edge 16. The end portion 15 of the inner wall 8b is shown after folding, in an upright position, with dotted lines.

Figure 6:
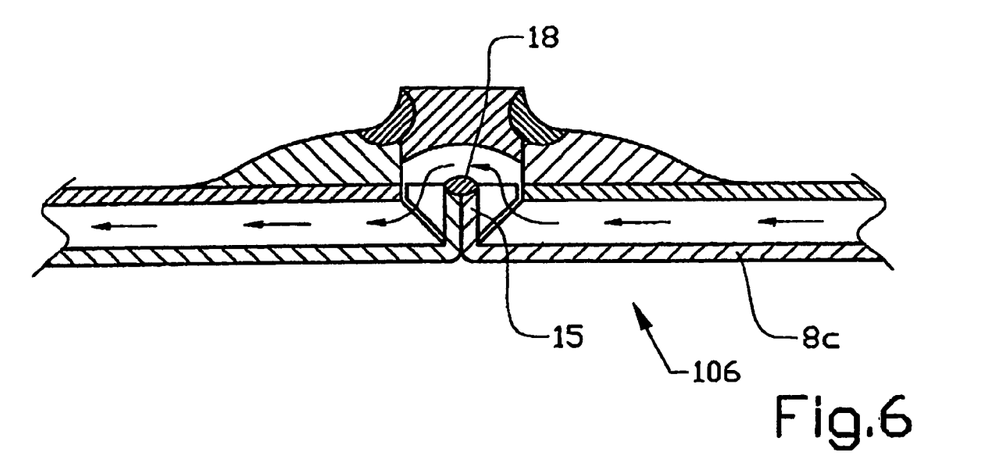
FIGS. 6-8 show a second embodiment of the invention corresponding to FIG. 3-6.
Figure 7:
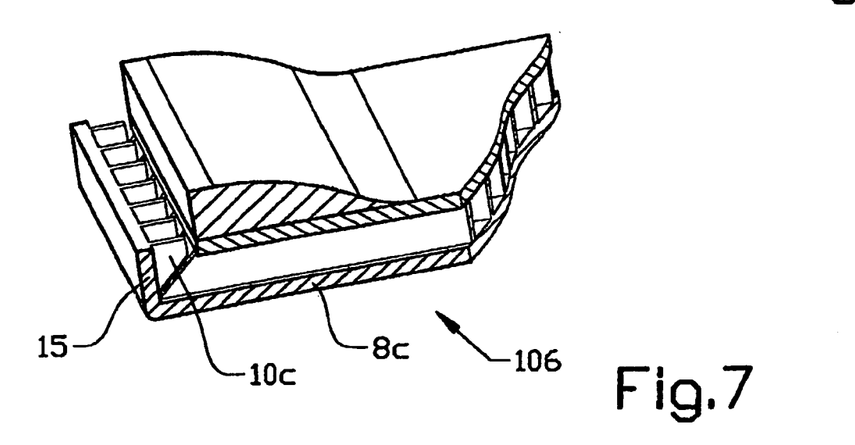
Figure 8:
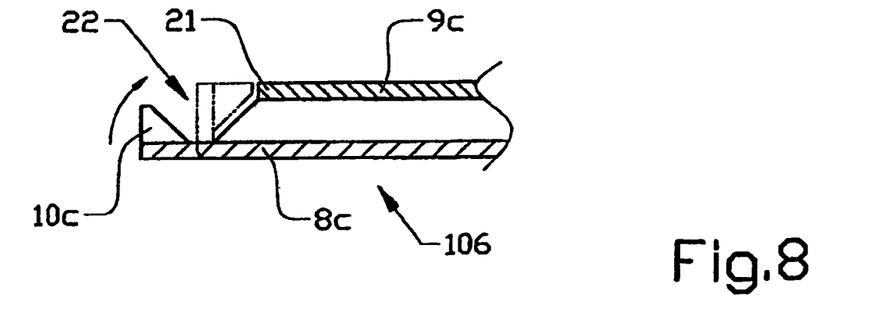

FIGS. 6-8 illustrate a second embodiment of the invention. This embodiment differs from the first embodiment in that partition walls 10c are also arranged on the end portion 15 of the inner wall 8c. In a first step, the piece 106 is manufactured in such a way that the partition walls extend all the way to the end of the inner wall. Thereafter, a groove 22 is cut through the partition walls towards the inner wall 8c in the vicinity of the end 21 of the outer wall 9c forming a notch for folding the end portion of the inner wall.

Thereafter, the end portion 15 is folded towards the end of the outer wall 9c.

Figures 9, 10:
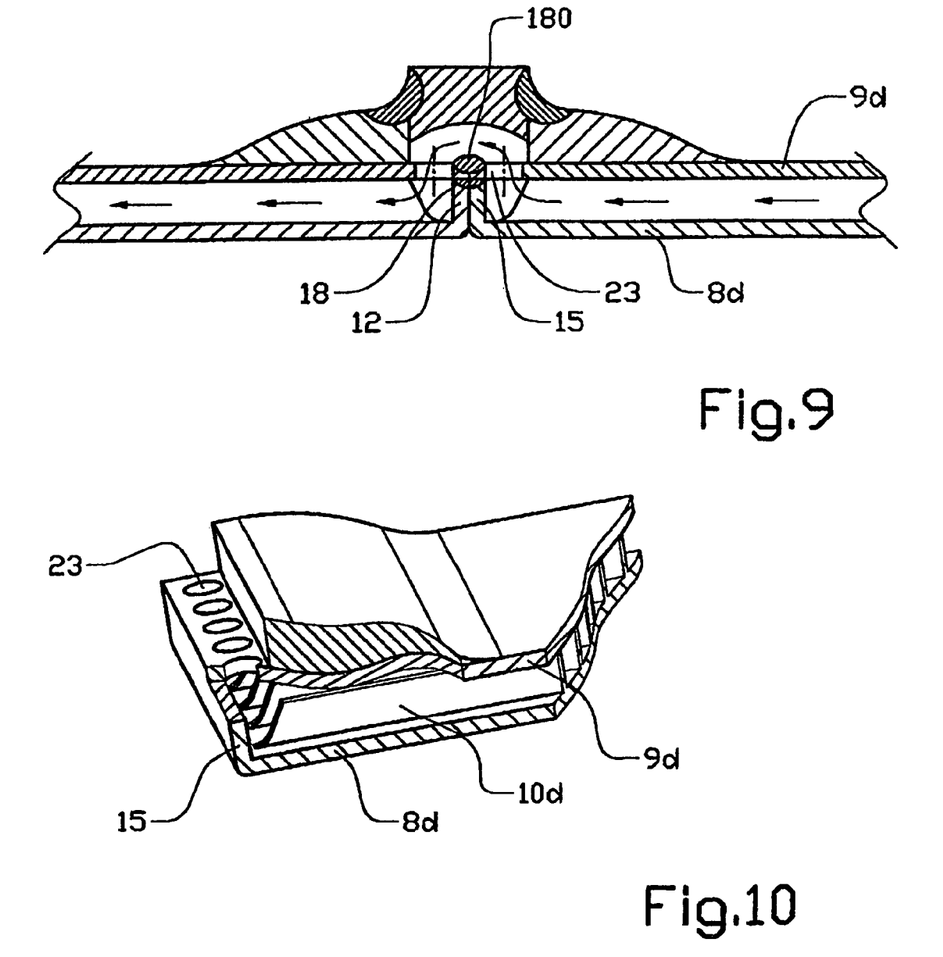
FIGS. 9-10 show a third embodiment of the invention corresponding to FIG. 3-4.

FIGS. 9-10 illustrate a third embodiment of the invention. This embodiment differs from the first embodiment in that the outer wall 9d extends to the inclined and outwards projecting end portion 15 of the inner wall 8d. Further, the outer wall 9d is connected to the end portion 15 of the inner wall, preferably by welding. Two welding operations are thereby performed; a first welding for connecting the end portions 12,15 and forming a first joint 18 and a second welding for connecting the outer wall 9d to the end portions forming a second joint 180. Further, a plurality of openings 23 are arranged through the outer wall 9d at mutual distances in the vicinity of the end portion 15 of the inner wall 8d. Passages for a coolant flow is thereby formed by the openings 23 from the cooling channel in the radial direction of the section.

Figure 11:
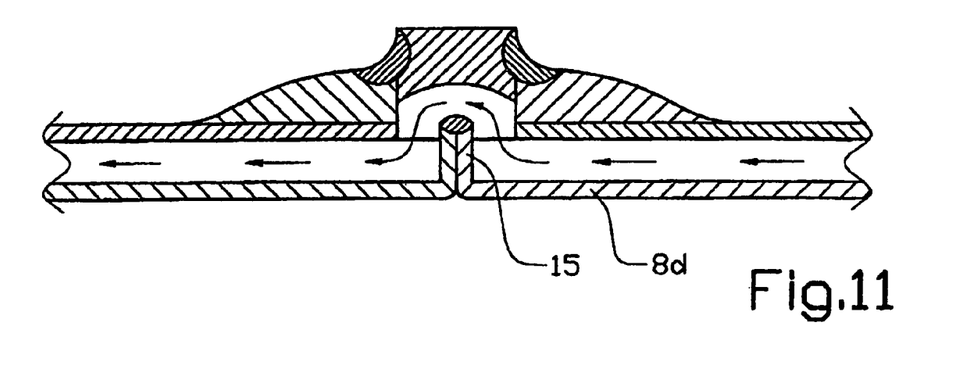
FIGS. 11-12 show a fourth embodiment of the invention corresponding to FIG. 3-4.
Figure 12:
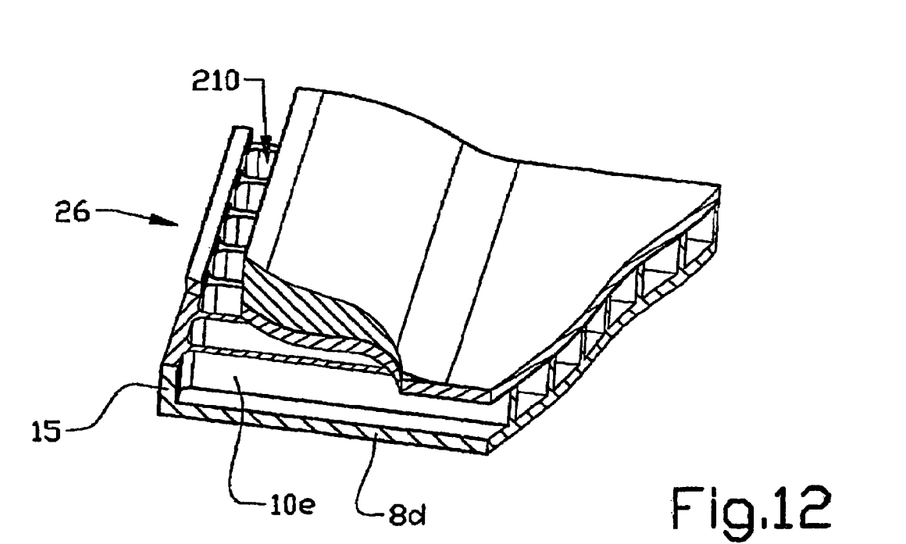

FIGS. 11-12 illustrate a fourth embodiment of the invention. This embodiment differs from the first embodiment in that each of the partition walls 10e is continuous in its longitudinal direction all the way to the radially outwards projecting end portion 15. The partition walls are here formed integral with the end portion 15 of the inner wall 8d and with the inner wall 8d.

The wall-structure of a section configured according to this fourth embodiment is produced by machining, preferably by milling, a plate-shaped starting material. A flat end surface 26 is provided in such a way that a plurality of elongated, substantially parallel and straight valleys (elongate recesses) 210 are formed at straight angles (substantially right-angles) with the flat end surface. The valleys 210 stop at a distance from the flat end surface so that the remaining, non-machined part of the starting material forms the inner wall end portion 15.

Figure 13:
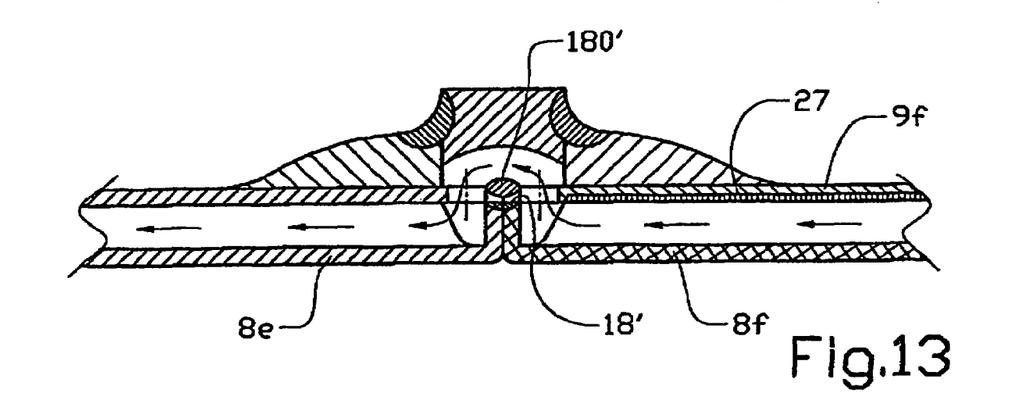
FIG. 13 shows a fifth embodiment of the invention corresponding to FIG. 3.

FIG. 13 illustrates a fifth embodiment of the invention. This embodiment differs from the first embodiment in that the inner walls 8e, 8f of the two sections are made of different materials. For example, the inner wall 8e of the first section is made of a stainless steel or nickel based superalloy, and the inner wall 8f of the second section is made of copper.

The partition walls are formed integral with the inner wall 8f and are thereby made of the same material as the inner wall. The outer wall 9f is made of a material different from copper and is connected to the partition walls by brazing, such as is exemplified by joint 27. The first joint 18' connects the end portions of the inner walls 8e, 8f, and which is exemplarily and preferably formed as a braze joint. Exemplarily and preferably, the second joint 180' is a weld joint.

Figure 14:
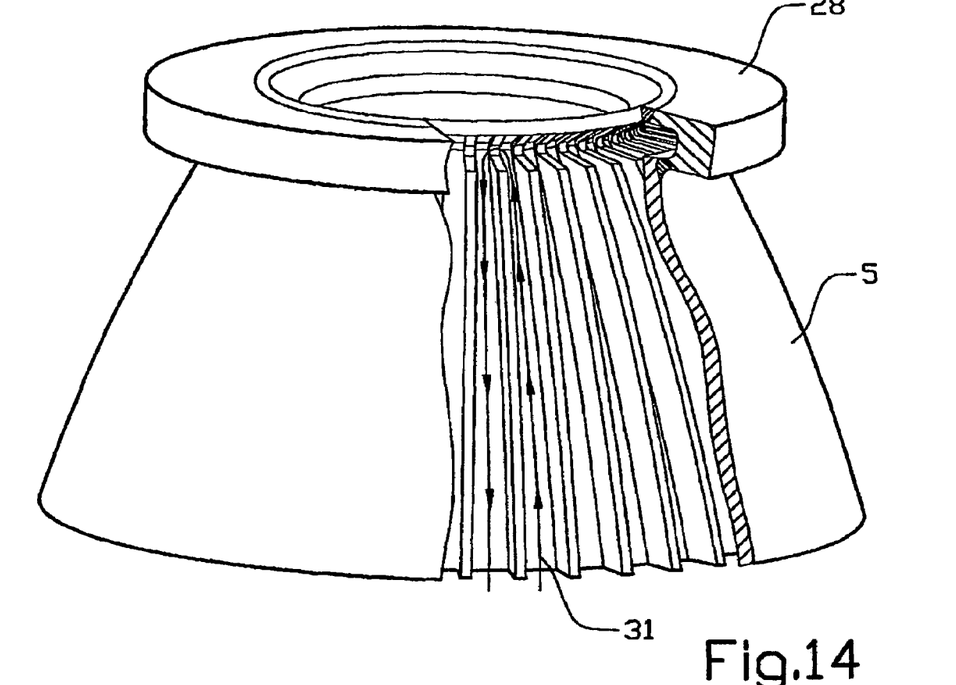
FIG. 14 shows a partly cut, perspective view of a sixth embodiment of the invention, wherein the part shown in FIG. 2 is connected to a manifold.
Figure 15:
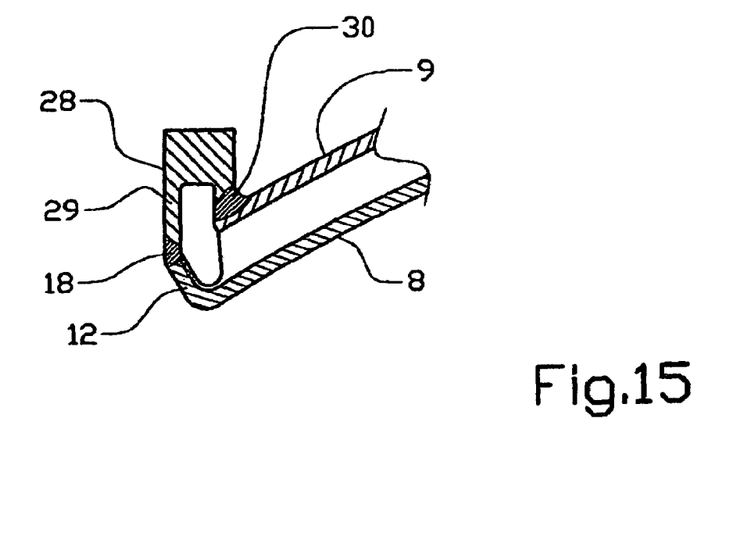
FIG. 15 shows a cross section view of the connection region between the part and the manifold according to FIG. 14.

FIGS. 14-15 illustrate a sixth embodiment of the invention. The first rocket engine section 5 is connected to a second part 28 in the form of a conduit for the coolant flow. The conduit 28 is normally referred to as a manifold. The conduit 28 extends around the end part of the first section on the outside of the same and is arranged to convey the coolant from and to the cooling channels. The manifold 28 is therefore called a turning manifold. The arrows 31 illustrate the coolant flow.

The conduit 28 has a substantially U-shape in cross section, wherein the end portion 12 of the inner wall 8 is joined to one leg 29 of the U and the other leg 30 of the U is connected to an end 9 of the outer wall.

Preferred materials for the sections described above are stainless steel, alloys with high extent of ferro and nickel, and nickel based superalloys.

The first part, in the form of the rocket engine section 5, has a curved shape, wherein the inner wall is arranged on the concave side and the outer wall is arranged on the convex side of the part.

The invention is not in any way limited to the above described embodiments, instead a number of alternatives and modifications are possible without departing from the scope of the following claims.

For example the partition walls may not be formed integral with the inner wall, but instead formed separately and connected to the inner wall.

As an alternative to the plurality of openings 23 arranged through the outer wall 9d at mutual distances in the vicinity of the end portion 15, only one opening in the form of a slot may be arranged in the vicinity of the end portion 15 and extending around the section.

The above described two joining operations for obtaining two joints 18,180 and 18'; 180', respectively, may be replaced by only one joining operation, preferably welding, which thereby forms only one joint.

The invention is above described for embodiments where the first part has a circular cross section shape. The invention may, however, also be used for connecting parts with some other curved shape, and especially also for parts which are discontinuous in the circumferential direction. Further, the invention may be used for connecting parts with a substantially flat shape. One section could in this case be formed by a plurality of plate-shaped parts which are mutually connected in the circumferential direction of the section. The section would in such a case have a polygonal cross section shape.

The invention claimed is:

1. A multi-section component (1) configured for being subjected to high thermal load during operation, said multi-section component comprising:
   a wall structure defining an inner space of the multi-section component for gas flow, said wall structure being composed of at least two sections (5, 6) each of which comprises
   an inner wall (8a, 8b) an outer wall (9a, 9b) and at least one cooling channel (11) located therebetween, said at least two sections being interconnected together, with adjacent end portions (21) of respective outer walls (9a, 9b) being joined together and with abutting end portions of respective inner walls (8a, 8b) being joined together by a joint (18) located at a distance, and in isolation from the defined inner space of the multi-section component.

2. The multi-section component as recited in claim 1, wherein said end portions of said inner walls (8a, 8b) project outwards from the interior of the component and the joint (18) is located at a distance from an edge (13) of the inner walls (8a, 8b) thereby defining said end portions (12).

3. The multi-section component as recited in claim 2, wherein said end portions of said inner walls (8a, 8b) project at a substantially perpendicular angle from an adjacent portion (14) of the respective inner wall (8a, 8b) of said at least two sections (5, 6).

4. The multi-section component as recited in claim 2, further comprising at least one opening (23) arranged through the outer walls (9a, 9b) in the vicinity of the end portions of the inner walls (8a, 8b) thereby forming a passage for a coolant flow from said cooling channel.

5. The multi-section component as recited in claim 4, further comprising:
   a plurality of openings (23) arranged through the outer wall at mutual distances along said joint (18).

6. The multi-section component as recited in claim 1, wherein said wall structure comprises a plurality of partition walls (10) arranged between the inner walls (8a, 8b) and outer walls (9a, 9b) and that extend between an inlet end to an outlet end of the wall structure and thereby delimit said at least one cooling channel (11).

7. The multi-section component as recited in claim 1, wherein each of said sections has a curved shape.

8. The multi-section component as recited in claim 7, wherein each of said sections is continuous in its circumferential direction.

9. The multi-section component as recited in claim 1, wherein said component (1) has a substantially circular cross section.

10. The multi-section component as recited in claim 1, wherein said component (1) is a rocket engine component.

11. The multi-section component as recited in claim 1, wherein said abutting end portions are (12) welded together at said joint (18).

12. The multi-section component as recited in claim 1, wherein said abutting end portions are (12) soldered together at said joint (18).

13. The multi-section component as recited in claim 1, wherein said at least two sections are continuous in a circumferential direction thereof.

14. The multi-section component as recited in claim 13, wherein said at least two sections (5, 6) have a curved shape.

15. A component configured for being subjected to a high thermal load during operation, said multi-section comprising:
   a wall structure defining an inner space of the component for gas flow;
   a first part comprising an inner wall, an outer wall and at least one cooling channel located between the walls; and,
   an end portion of said inner wall being joined to a second part by a joint located at a distance, and in isolation from the defined inner space of the component wherein said outer wall ends at a distance from the end portion of the inner wall in the extension direction of the wall structure and wherein a gap between the outer wall and the end portion of the inner wall forms a passage for a coolant flow from said cooling channel.

16. A component configured for being subjected to high thermal load during operation, said component comprising:
   a wall structure defining an inner space of the component for gas flow;
   a first part (5) comprising an inner wall (8), an outer wall (9) and at least one cooling channel (11) located between the walls;
   an end portion (12) of said inner wall being joined to a second part (6, 28) by a joint (18) located at a distance from the defined inner space of the component and wherein said first part (5) has a curved shape and is continuous in its circumferential direction; and
   a ring-shaped element (20) arranged outside said joint (18) circumferential around the component, said ring-shaped element (20) being connected to end portions of the outer walls of the first and second parts and thereby forming a passage for a coolant flow from said cooling channel of the first part to said cooling channel of the second part.

17. A component configured for being subjected to high thermal load during operation, said component comprising:
   a wall structure defining an inner space of the component for gas flow;
   a first part (5) comprising an inner wall (8), an outer wall (9) and at least one cooling channel (11) located between the walls and wherein said first part (5) has a curved shape and is continuous in its circumferential direction;
   an end portion (12) of said inner wall being joined to a second part (6, 28) by a joint (18) located at a distance from the defined inner space of the component; and
   wherein said component comprises a conduit for the coolant flow with said cooling channel of the first part (5), said conduit extending around said first part on the outside thereof and wherein said conduit has a substantially U-shape in cross section and the end portion of the inner wall is joined to one leg of the U and the other leg of the U is connected to an end portion of the outer wall.

18. A method for manufacturing a multi-section component (1) adapted for being subjected to high thermal load during operation, said method comprising:
   providing a component comprising: a wall structure defining an inner space of the component for gas flow, said wall structure being composed of at least two sections (5, 6), each of which comprise an inner wall (8a, 8b), an outer wall (9a, 9b) and at least one cooling channel (11) located therebetween, said at least two sections being interconnected together with adjacent end portions (21) of respective outer walls (9a, 9b) being joined together and with abutting end portions of respective inner walls (8a, 8b) being joined together by a joint (18) located at a distance, and in isolation from the defined inner space of the component.

19. The method as recited in claim 18, wherein the wall structure is produced so that said end portions of said inner walls (8a, 8b) project outwards from the interior of the component and the joint (18) is located at a distance from an edge (13) of the inner walls (8a, 8b) thereby defining said end portions.

20. The method as recited in claim 19, further comprising:
   configuring the wall structure so that said inner walls (8a, 8b) are arranged in parallel with said outer walls (9a, 9b) and said inner walls (8a, 8b) project a distance from the end of the outer wall;
   folding the projecting end portions of said inner walls (8a, 8b) towards respective outer walls (9a, 9b) and
   joining said inner walls (8a, 8b).

21. The method as recited in claim 20, wherein partition walls for delimiting adjacent cooling channels are arranged between the inner and outer walls and are arranged on the end portion of the inner wall, and a groove is cut through the partition walls towards the inner wall in the vicinity of the end of the outer wall thereby forming a notch for folding said end portion of the inner wall.

22. The method as recited in claim 20, wherein partition walls for delimiting adjacent cooling channels are arranged between the inner and outer walls and said partition walls end substantially where the outer wall ends and the end of said partition walls forms a notch for folding said end portion of the inner wall.

23. The method as recited in claim 19, wherein the wall structure is produced by machining a plate-shaped starting material with a flat end surface in such a way that a plurality of elongated, substantially parallel and straight valleys are formed at straight angles with the flat end surface, and that said valleys stop at a distance from the flat end surface, wherein the remaining, non-machined part of the starting material forms said inner wall end portion.

24. The method as recited in claim 18, wherein the joining operation is performed from the outside, inwards.

25. The method as recited in claim 18, wherein said at least two sections (5, 6) are joined together by welding.

26. The method as recited in claim 18, wherein at least two sections (5, 6) are continuous in a circumferential direction, that a ring-shaped element (20) is arranged outside said joint (18), around the component and connected to ends of the outer walls of the at least two sections (5,6), thereby forming a passage for a coolant flow between said cooling channels in said at least two sections.

27. The method as recited in claim 18, wherein at least one of said at least two sections comprises a conduit for the coolant flow with said cooling channel, said conduit being arranged to extend around said first part on the outside of the same.

28. The method as recited in claim 27, wherein said conduit has a substantially U-shape in cross section, that the end portion of the inner wall is joined to one leg of the U, and that the other leg of the U is joined to an end portion of the outer wall of the first part.

* * * * *